United States Patent [19]

Negishi

[11] Patent Number: 4,458,488
[45] Date of Patent: Jul. 10, 1984

[54] HEAT ENGINE

[76] Inventor: Masataka Negishi, 1000, Oaza Ryoke, Urawa-shi, Saitama-ken, Japan

[21] Appl. No.: 364,938

[22] PCT Filed: Jul. 29, 1980

[86] PCT No.: PCT/JP80/00174
§ 371 Date: Mar. 24, 1982
§ 102(e) Date: Mar. 24, 1982

[87] PCT Pub. No.: WO82/00497
PCT Pub. Date: Feb. 18, 1982

[51] Int. Cl.³ ............................ F03G 7/06; F02G 1/04
[52] U.S. Cl. ........................................ 60/517; 60/530; 60/682
[58] Field of Search ................. 60/517, 518, 526, 530, 60/682, 650

[56] References Cited

U.S. PATENT DOCUMENTS

| 1,032,236 | 7/1912 | Patten | 60/650 |
| 2,397,734 | 4/1946 | Goebel et al. | 60/526 |
| 2,465,139 | 3/1949 | Van Weenen et al. | 60/518 |
| 2,596,051 | 5/1952 | Stigter | 60/526 |
| 3,232,045 | 2/1966 | Fokker | 60/518 |
| 3,692,099 | 9/1972 | Nesbitt et al. | 60/526 |

FOREIGN PATENT DOCUMENTS 665989 2/1952 United Kingdom ................. 60/517

Primary Examiner—Allen M. Ostrager
Attorney, Agent, or Firm—Wenderoth, Lind & Ponack

[57] ABSTRACT

A heat engine which has a cylinder, a piston freely reciprocally slidable within the cylinder, a casing enclosing the cylinder and having a space therewithin surrounding the outside of the cylinder, the space having axial end portions respectively communicating with the spaces in the cylinder space on opposite ends of the piston, and the casing having a bearing wall part at one axial end thereof. A mass of incompressible fluid fills the interior of the cylinder and the space and is a fluid which undergoes volumetric variation with temperature variation. A piston rod fixed to the piston extends axially of the cylinder outward through the bearing wall part, and an output displacement member in the form of a sleeve is fitted slidably around and coaxially slidable on the piston rod and extending slidably and sealingly through the bearing wall part. The end of the output displacement member in the interior of the casing has a pressure-receiving surface for receiving a force directed outward from the casing due to thermal expansion of the fluid within the casing. The casing is cooled near one end of the cylinder and heated near the other end of the cylinder, and a crank mechanism couples the end parts of the piston rod and the output displacement member to an output shaft.

13 Claims, 7 Drawing Figures

HEAT ENGINE

TECHNICAL FIELD

This invention relates to heat engines in which volumetric variations of fluids due to heating and cooling are utilized, and particularly to a heat engine in which an incompressible fluid is used.

BACKGROUND ART

A heat engine in which; by causing a warm field and a cold field to act alternately on an incompressible substance which undergoes volumetric variation due to temperature variation, alternating volumetric variation is caused to occur in the incompressible substance; this volumetric variation is changed into a linear displacement of an output displacement member; and rotational motion is taken out (derived) from this by way of a motion-conversion mechanism is publicly known as the present applicant has previously proposed (reference being made to U.S. Pat. No. 4,222,239 of Sept. 16, 1980.

In this known heat engine, a liquid or a solid, for example a paraffinic substance, is used as the above mentioned incompressible substance, and, in order to derive the volumetric variation of this incompressible substance as a mechanical displacement, and output displacement member is provided in direct contact with the incompressible substance, or another displacement transmitting medium is interposed between the incompressible substance and the output displacement member. The provision of the output displacement member in direct contact with the incompressible substance is desirable because that the volumetric variation of the incompressible substance can be changed directly into displacement of the output displacement member. However, in this case, in order to cause a warm field and a cold field to act alternately on the incompressible substance, a piston which undergoes displacement while dividing the warm field and the cold field is necessary, and a complicated mechanism is required for driving this piston. On the other hand, in the above mentioned latter case wherein another displacement transmitting medium is interposed between the incompressible substance and the output displacement member, a sealing member for separating the incompressible substance itself from the above mentioned medium is necessary, and, moreover, it is necessary to cause the incompressible substance to move alternately between the warm field and the cold field while sealing it with the sealing member, for which a complicated mechanism similarly becomes necessary.

This invention has an object of making the heat engine of the above described type, which is mechanically complicated and is relatively wasteful, more compact both mechanically ans spatially for making it into an engine which is suitable for practical use.

DISCLOSURE OF THE INVENTION

According to this invention, the above stated object is attained by, a heat engine comprising: a cylinder; a piston provided in a freely slidable manner within this cylinder; a casing forming a space so encompassing the outer side of the cylinder as to cause the cylinder space on one side of the piston and the cylinder space on the other side of the same to be communication via the outer side of the cylinder; a fluid filling the interior of the cylinder and said spaces and undergoing volumetric variation with temperature variation; a piston rod fixed to the piston and extending outward through said casing; an output displacement member extending through the casing in a freely slidable manner along the piston rod and having, at one end thereof in the interior of the casing, a pressure-receiving surface for receiving a force directed outward from the casing due to thermal expansion of the fluid within the casing; means for cooling the casing part near one end of the cylinder; means for heating the casing part near the other end of the cylinder; and a crank mechanism for coupling, outside of the casing, the end parts of said piston rod and output displacement member with a phase difference to an output shaft.

BEST MODES FOR CARRYING OUT THE INVENTION

Examples of the engine according to this invention will now be described with reference to the drawings.

Figure 1:
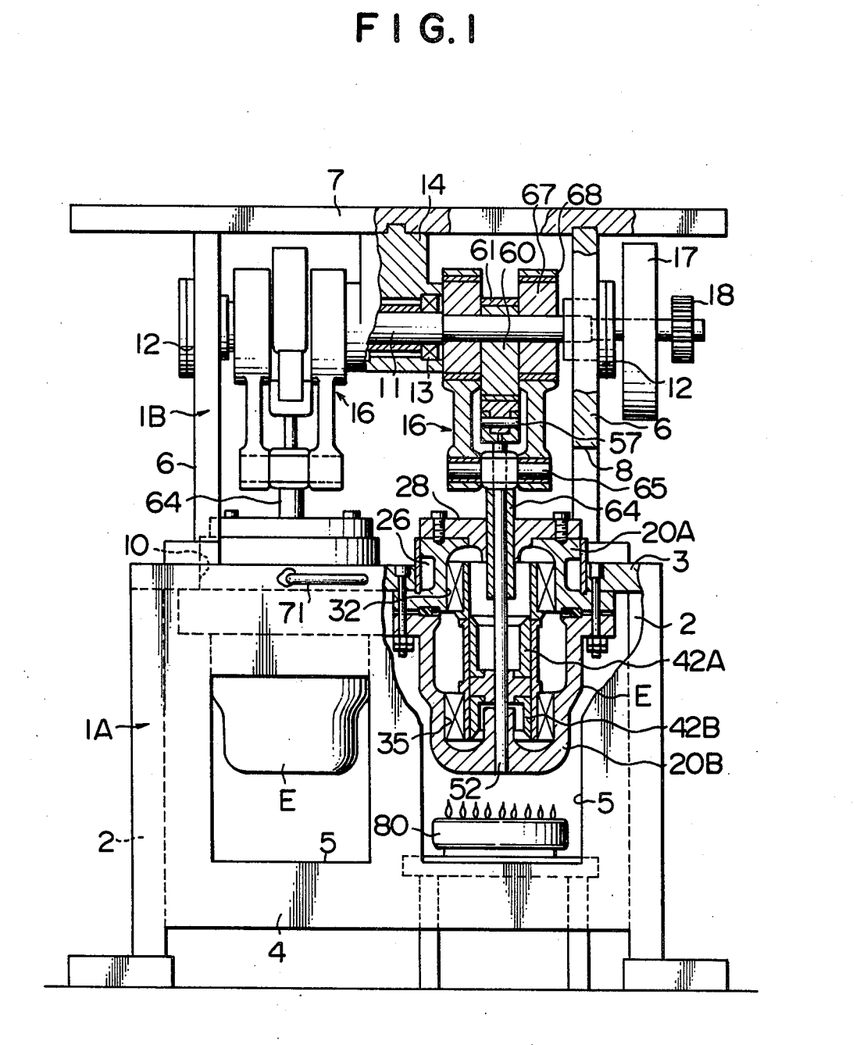
FIG. 1 is a side view, partially in section, showing one example of a heat engine of this invention.
Figure 2:
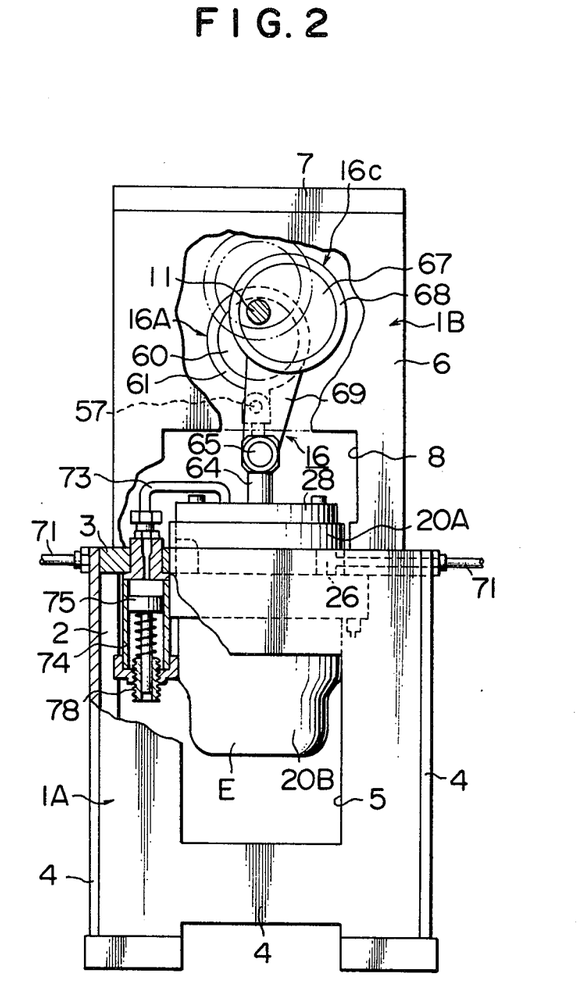
FIG. 2 is an end view, partially in section, of the same.

In FIG. 1, a lower frame 1A is provided for supporting the heat engine of this invention. An upper frame 1B is fixed on this lower frame 1A. The lower frame 1A has a top plate 3 supported by columns 2. The four side faces of the lower frame 1A are covered by side plates 4, in each of which an opening 5 is formed as shown in FIG. 2. The upper frame 1B is constituted by opposed upright support plates 6 and a top plate 7 connecting the upper ends of these upright support plates 6. In one of the support plates 6, an opening can be provided as shown at 8.

In the top plate 3 of the lower frame 1A, two circular holes 10 are provided in a row, and into each of these circular holes 10, a main body portion E of the heat engine of this invention is inserted and is fixed so as to be suspended from the top plate 3. On the one hand, on the upper frame 1B, the rotating output shaft 11 of the heat engine of this invention is supported in a freely rotatable manner by way of bearings 12 and 13. The bearings 12 are supported respectively on the aforementioned support plates 6, while the bearings 13 are provided in a bearing support member 14 mounted on the lower surface of the top plate 7. Each heat engine main body portion E is coupled via a crank mechanism 16 to the output shaft 11. As is apparent from FIG. 1, two of the crank mechanisms 16 are provided one for each of the two heat engine main body portions E. The output shaft 11 is provided with a flywheel 17 fixed thereto for stabilizing its output, which is taken out by, for example, a gear 18.

Figure 3:
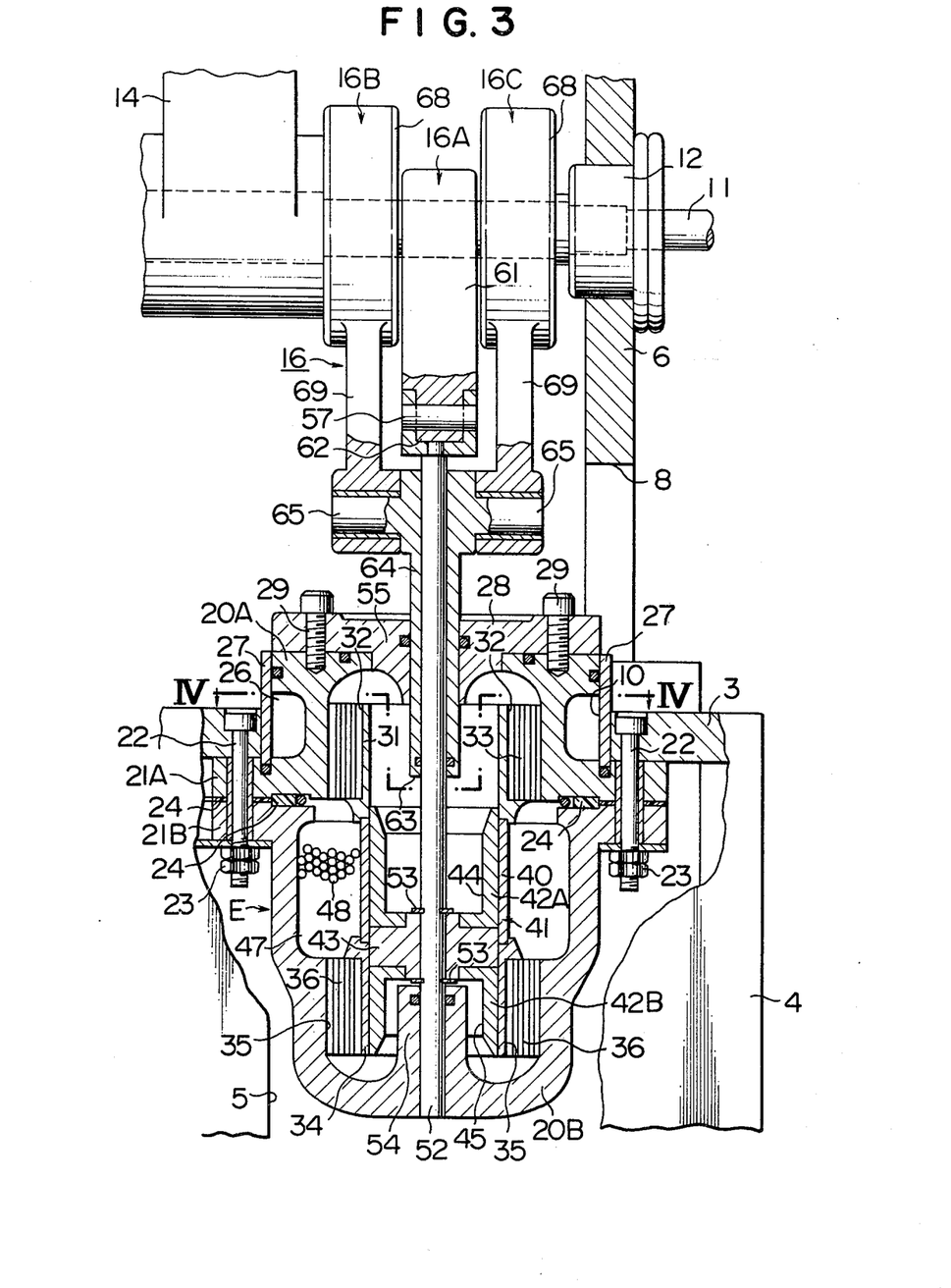
FIG. 3 is an enlarged sectional view of essential parts of the same.

The details of the heat engine main portion E are as shown in FIG. 3. The heat engine main portion E is provided with a casing comprising an upper casing part 20A and a lower casing part 20B. The upper casing part 20A has a flange 21A, while the lower casing part 20B has a flange 21B, and these flanges 21A and 21B are placed in flush contact with each other and fastened by bolts 22 passed therethrough. The heads of the bolts 22 are inserted through and supported by the aforementioned top plate 3, and by screwing nuts 23 onto the lower end parts of the bolts, the casing 20A, 20B is supported by the top plate 3 in a state wherein it is fitted in the circular hole 10 of the top plate 3. Between the flanges 21A and 21B, a heat-insulating packing 24 made of a material as fabric-containing bakelite is interposed to suppress transfer of heat between the upper and lower casing parts.

The upper casing part 20A has around its outer periphery an annular recess 26, the outer side of which is closed by an annular closure plate 27, whereby a passage for a cooling fluid, for example, water, is formed within the recess 26. The closure plate 27 is adapted to contact intimately the inner surface of the circular hole 10. The upper open part of the upper casing part 20A is covered by a cover plate 28. The cover plate 28 is fixed by bolts 29 to the main structure of the upper casing part 20A.

Figure 4:
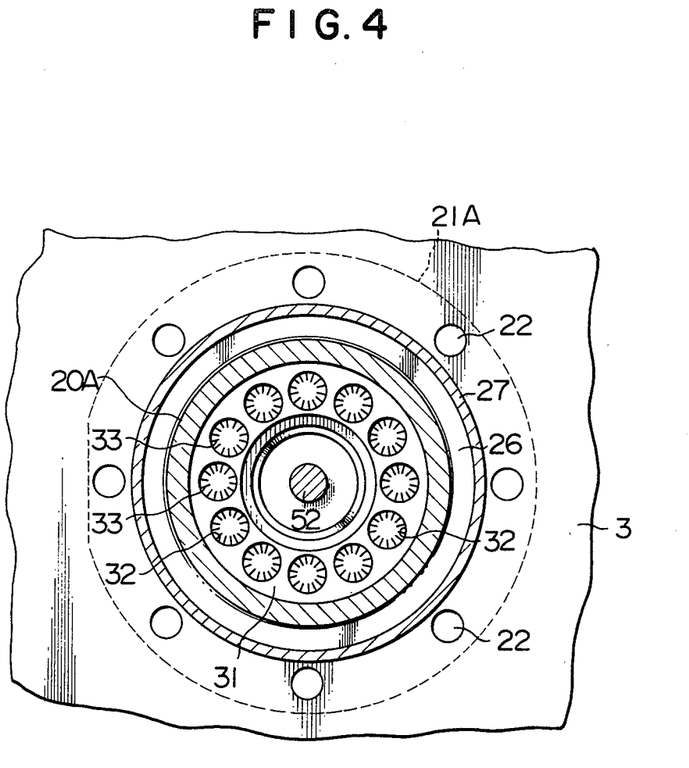
FIG. 4 is a sectional view on line IV—IV of FIG. 3.

As will be understood from FIG. 3 and FIG. 4, an annular projecting part 31 projects inward on the inner side of the upper casing part 20A, and in this projecting part 31, a series of fluid-passage holes 32 are formed in an annular arrangement. The fluid-passage holes 32 constitute a first heat-exchange part. It is desirable that in each of the fluid-passage holes 32, a large number of fins 33 integral with or separate from the projecting part 31 be provided, or some other heat-exchange-promoting member be provided.

On the inner side of the lower casing part 20B, an annular projecting part 34 similar to the annular projecting part 31 is also formed in the inward direction, and in this part is a series of fluid passage holes 35 in an annular arrangement. These fluid passage holes 35 constitute a second heat-exchange part. It is desirable that in each of these fluid passage holes 35, a large number of fins 36 also be provided or some other heat-exchange-promoting member of some form be fitted.

Between the lower edge of the annular projecting part 31 of the upper casing part 20A and the upper edge of the annular projecting part 34 of the lower casing part 20B is a hollow cylinder 40 integrally connected to parts 31 and 34, the inner wall surfaces of the annular projecting parts 31 and 34 and the inner wall surface of the hollow cylinder 40 being aligned to define a single cylindrical surface defining a cylinder having a cylindrical axis 41 extending in the up-and-down direction within the casing 20A, 20B.

Within the cylinder 41, a piston comprising piston elements 42A and 42B is fitted so as to be freely slidable up and down. Between these piston elements 42A and 42B is connected a heat-insulating member 43 made of, for example, bakelite, which suppresses the transfer of heat between the two piston elements. In the piston elements 42A and 42B are provided hollow parts 44 and 45 concavely recessed toward the heat-insulating member 43 therebetween.

An interior space 47 within the casing around the outside of the above described hollow cylinder 40 constitutes a heat-recovery part, and the interior of this space 47 is packed with heat recovery means in the form of numerous steel balls 48, for example. The size of the steel balls varies depending on the conditions. The steel balls are mutually in point contact with each other, and between them are countless gaps through which an incompressible fluid, described hereinafter, passes. These steel balls, as described hereinafter, have a heat-recovering function whereby, when a fluid with a high temperature, for example, passes in one direction as it contacts them, they absorb heat from the fluid, and when a fluid with a low temperature passes in the other direction as it contacts them, they impart heat to the fluid. However, since the steel balls are only in mutual point contact with each other, there is very little imparting-receiving of heat mutually between the steel balls.

Figure 5:
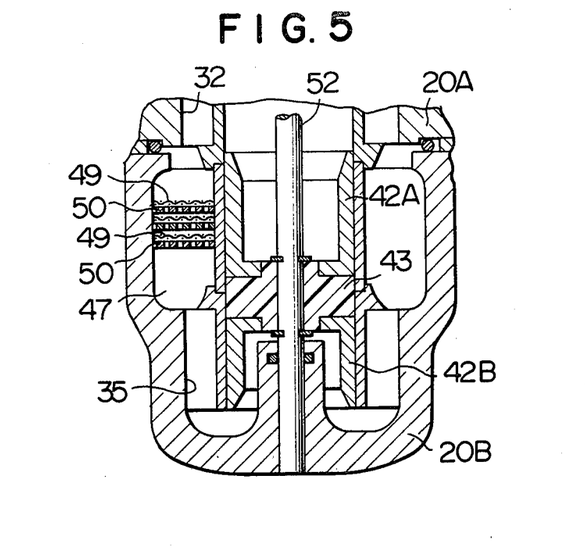
FIG. 5 is a partial sectional view showing another example of practice.

For achieving a function similar to the steel balls 48 to be carried out, any heat recovery means can be adopted. For example, as shown in FIG. 5, a laminated structure in which wire-mesh sheets 49 and perforated bakelite plates 50 are disposed alternately in the vertical direction can be placed within the space 47. In this example, the wire-mesh sheets 49 exchange heat with the fluid, and the bakelite plates 50 suppress the transfer of heat in the vertical direction.

A piston rod 52 extends through the above described piston 42A, 42B in the vertical direction and is secured to the piston by rings 53. The piston rod 52 extends slidably through and is supported by a bearing part 54 provided in the lower casing part 20B and extends through a bearing part 55 provided in the upper casing part 20A.

The upper end of the piston rod 52 is pivotally coupled by a pin 57 to one part 16A of the aforedescribed crank mechanism 16 above the upper casing part 20A. As shown in FIG. 2, the part 16A has an eccentric disk 60 fixed to the rotating output shaft 11 and a ring 61 freely slidable mounted on the outer periphery of this disk. A projecting part 62 (FIG. 3) of this ring 61 has the aforementioned pin 57 inserted therethrough. By the mechanism described above, when the piston rod 52 and the piston 42A, 42B undergo vertical reciprocating displacement the shaft 11 is rotated through the crank mechanism part 16A.

Referring again to FIG. 3, through the bearing part 55 of the cover plate 28 of the upper casing part 20A slidably extends a cylindrical output displacement member 64 having at its lower end a pressure-receiving surface 63, which output displacement member also is slidably fitted coaxially around the piston rod 52. On opposite sides of the upper end of the output displacement member 64 are integral trunnions 65 which extend in the transverse direction to the axis of member 64. In the crank mechanism 16 coupled to the output shaft 11, there are two other parts 16B and 16C, and the trunnions 65 are coupled by way of these parts 16B and 16C to the output shaft 11. Similar to the part 16A, each of the parts 16B and 16C has an eccentric disk 67 fixed to the output shaft 11 and a ring 68 freely slidably mounted around the outer periphery thereof, and the lower end of an integral crank arm 69 extending downward from each ring 68 is fitted around a trunnion 65. Accordingly, when the output displacement member 64 is displaced up or down, the output shaft 11 is rotated by the crank mechanism parts 16B and 16C. The parts 16B and 16C are retarded in rotational phase by 90 degrees, for example relative to part 16A.

Cooling water for cooling the upper casing part 20A flows through recess 26 from a pipe line 71 (FIGS. 1 and 2). The pipe line 71 communicates with the recess 26 through a passage provided from the side surface of the lower frame 1A to the top plate 3.

The interior space of the casing 20A, 20B including the interior space of the cylinder 41 is filled with the aforementioned incompressible fluid. This fluid is selected from substances having volumetric variations due to temperature variation which are large, heat conductivities which are high, and specific heats which are small. Examples of usable substances are alcohols, aqueous ammonia, paraffin oil, and benzene. These substances can be used singly or mixed. As an example of a mixture, one which is an emulsion obtained by mixing powder of paraffin in an alcohol can be used. A mixture resulting from the mixing and dispersion of a gas in an alcohol to form an emulsion can also be used. In addition, various materials obtained by dispersing solids, liquids, and gases in liquids thereby to form emulsions can be used, but in such cases, lowering of the incompressibility of the fluid, lowering of the volumetric variation rate with temperature variation, etc., must be prevented.

Figure 6:
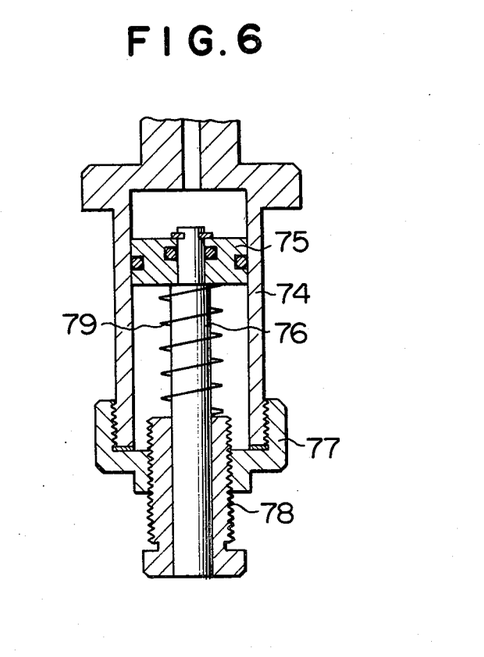
FIG. 6 is an enlarged sectional view of a fluid quantity adjusting cylinder.

As shown in FIG. 2, the interior space of the casing 20A, 20B is connected, for example, by a pipe 73 extending through the cover plate 28 to the outside, with the interior of a fluid quantity adjusting cylinder 74 supported on the top plate 3. Within this cylinder 74 is provided a piston 75, the incompressible fluid also filling the space above the piston 75. The details of the fluid quantity adjusting cylinder 75 are as shown in FIG. 6: a piston rod 76 of the piston 75 is freely slidable in the interior of an adjusting sleeve screwed into a cap 77 screw connected to the lower end of the cylinder 74. Furthermore, between the upper end of the adjusting sleeve 78 and the lower surface of the piston 75 is postioned a compression spring 79 pressing the piston 75 upward against the pressure of the fluid within the casing 20A, 20B. Accordingly, when the fluid pressure within the casing rises, the piston 75 is displaced downward as it compresses the spring 79. The spring force of the spring 79 is adjusted by varying the amount the adjusting sleeve 78 is screwed in.

Next, the operation of the heat engine described above will be explained.

Prior to running the engine, cooling water is caused to flow through the cooling water passage formed by the annular recess 26 in the upper casing part 20A to start cooling of the upper casing part 20A, and, together with this, a suitable heating means such as a combustion device 80 is positioned within the lower frame 1A as shown in FIG. 1 to start heating the lower casing part 20B from below. It is to be noted here that a combustion device need not always be used for heating, it being possible to use solar heat or some other source. In the case where a combustion device 80 (for example, a gas burner) is used as shown in the figure, the openings 5 serve usefully for observation of the state of combustion and for discharge of the combustion gases. Even when the upper and lower casing parts 20A and 20B are thus respectively cooled and heated, since the heat-insulating packing 24 is present therebetween, the cooling and heating of the two casing parts have little influence on each other.

With the upper casing part and the lower casing part respectively being started cooling and heating as described above, the engine is started, at which starting, for example, with the cooling and heating not yet having reached steady states, a suitable rotation is first imparted to the rotating output shaft 11. This is ordinarily done manually. As a consequence of the rotation of the output shaft 11, the output displacement member 64 is urged to undergo downward displacement. However if it is assumed that the incompressible fluid in the interior of the casing 20A, 20B at this time is confined therein and completely fills the casing interior, the output displacement member 64 is incapable of being displaced, and the manual rotation of the output shaft 11 becomes impossible, whereby, in order to enable the transfer of the fluid to the outside of the casing or into the interior of the casing, the above described fluid quantity adjusting cylinder 74 is utilized. That is, for example, in the case where the output displacement member 64 undergoes displacement in the inward direction of the casing, the fluid within the casing is sent into the cylinder 74 through the pipe 73 as the piston 75 is pressed downward an amount corresponding to the displacement of the output displacement member. In this case, by retracting the adjusting sleeve 78, the force of the compression spring 78 is reduced, thereby enabling the piston 75 to readily retract against the force of the spring 79.

Thus, by making the displacement of the output displacement member 64 possible, the manual rotation of the output shaft is made possible, and the vertical displacement of the piston 42A, 42B is caused by the displacement of the piston rod 52. As the output displacement member 64 and the piston 42A, 42B are thus caused manually to undergo vertical displacement, the cooling and heating approach their steady states, but, since the heat engine, in concert with this, begins to run under its own power for the reasons set forth hereinafter, the manual force is gradually reduced, and, together with this, the adjusting sleeve 78 of the fluid quantity adjusting cylinder 74 is screwed in to increase the force of the compression spring 79, thereby substantially locking the imcompressible fluid within the casing. In this connection, when the above described starting process is appropriately automatized, the screwing in of the adjusting sleeve 78 is also made automatic in this case.

Figure 7:
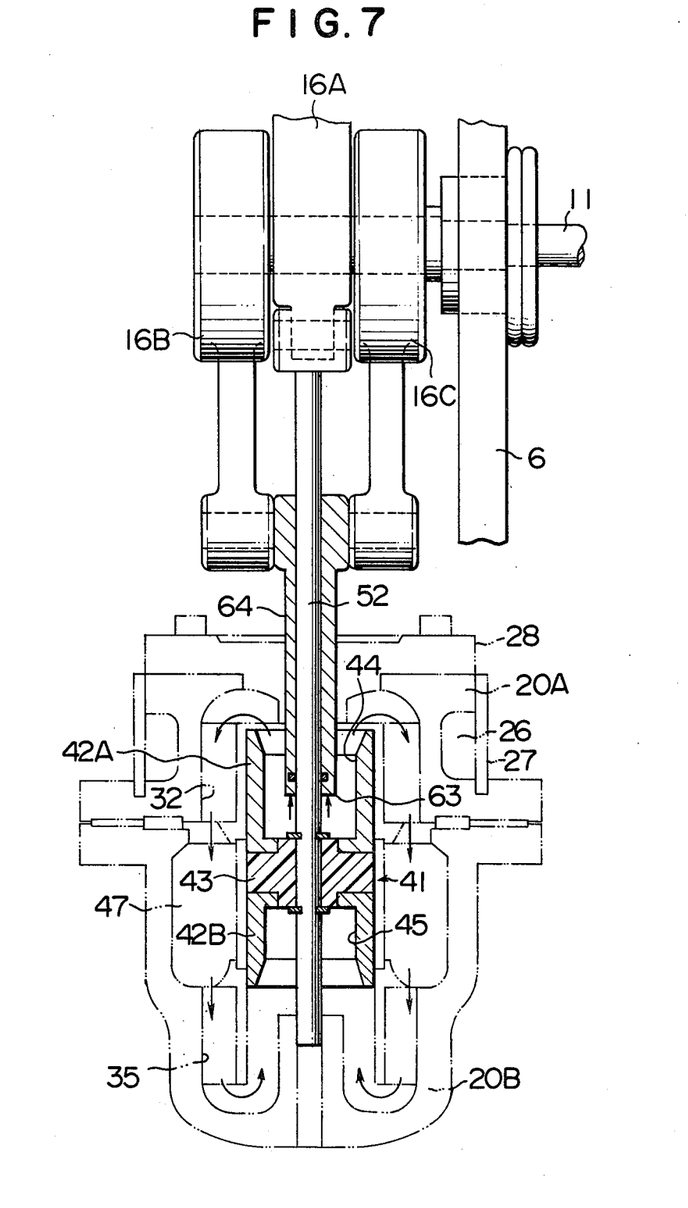
FIG. 7 is a view for explaining the operation thereof.

In the starting process as described above, when it is considered that the piston 42A, 42B has been moved to the top dead-center position, the fluid within the cylinder 41 on the upper side of the piston descends through the space within the casing along the outer periphery of the cylinder 41 and flows beneath the lower side of the piston within the cylinder 41 as indicated by arrows in FIG. 7. As a consequence, the volume of the fluid disposed within the lower casing part 20B and being heated increases, and the fluid thermally expands. The heating of the fluid within the lower casing part 20B is carried out in a short time by the good heat transfer in the second heat-exchange part including the fins 36, etc., within the fluid passage holes 35 of the casing part.

The fluid thermally expands in this manner and its volume increases, but since the fluid within the casing is confined within the casing by the force of the powerful compression spring 79, an upward force due to the increase of pressure within the casing accompanying the increase in volume of the fluid acts on the pressure-receiving surface 63 of the output displacement member 64, which is thereby displaced upward. By this upward force acting on the output displacement member 64, through the crank mechanism 16B and 16C, the output shaft 11 is rotated clockwise in FIG. 2, and this rotation is supplied as output through means such as the gear 18 shown in FIG. 1.

As a consequence of the rotation of the output shaft 11, the piston 42A, 42B, which has been at its top dead-center position, begins to undergo downward displacement. As a result, the heated fluid within the lower casing part 20B begins to travel upward through the space around the outside of the cylinder 41. While the fluid passes through the heat-recovery part constituted by the space 47 within the casing, it imparts its heat to the steel balls 48 or other heat recovery means therein. Since the steel balls 48 are in point contact with each other, as described hereinbefore, transfer of heat from steel ball to steel ball is small, and the temperature of the steel balls 48 within the space 47 is lower at the higher parts. The fluid is subjected to cooling in the first heat-exchange part constituted by the fluid-passage holes 32 and the fins 33 within the upper casing part 20A and enters into the upper end of upper casing part 20A.

When the piston 42A, 42B reaches the lower dead-center point, the parts are in the positions shown in FIG. 3, and the proportional of the overall amount of fluid within the upper casing part becomes greater, the fluid as a whole is cooled, whereby its volume is reduced.

The rotation of the output shaft 11 resulting from the upward displacement of the output displacement member 64 is sustained by the inertia of the flywheel 17 for preventing pulsating rotation of the output shaft, and the piston 42A, 42B at the lower dead-center position shown in FIG. 3 then moves upwardly to its top dead-center position of FIG. 7, the cycle being thus completed. Accordingly, as already described, the fluid is sent in great quantity into the lower casing part 20B for undergoing heating and, being reheated, thermally expands, whereby the output displacement member 64 is again subjected to an upward force and, rising, rotates the output shaft 11. The fluid being cooled passes through the space 47 as it descends and, receiving from the steel balls its own heat previously transferred to the balls, increases in temperature, then being further heated as it passes through the fluid passage holes 35. Therefore, as a result of the heat recovery carried out within the space 47, the efficiency of the engine is improved.

In the above described manner, the output shaft 11 continuously receives a turning force and thus rotates. Further, two heat engines E can be provided to drive the same output shaft 11 with a phase difference of, for example, 180 degrees. If, in this running operation, the pressure within the case should rise abnormally, the piston 75 within the fluid quantity adjusting cylinder 74 will retract against the force of the powerful spring 79 and thereby reduce the pressure rise.

The heat engine of this invention functions in the above described manner, but, since heat and cold are caused to act alternately on an incompressible fluid according to this invention, a relatively simple construction can be used, and, moreover, a small structure which is spatially compact becomes advantageously possible.

According to the examples of the practice of this invention, a high thermal economy can be achieved by the use of the heat-recovery means, and, further, by forming hollow parts in the upper and lower parts of the piston, a large quantity of the fluid can be exposed to the heat and the cold.

INDUSTRIAL APPLICABILITY

In the heat engine of this invention, water can be used as a cooling source and a combustion device, solar heat, or some other heat source can be used as the heating source; its operation is silent, whereby it can be used as a prime mover such as a prime mover of an electric generator and the like for household use, a prime mover of portable electric generators, a heat engine combined with a hybrid engine of a motor vehicle, or a maintenance-free prime mover utilizing solar heat in remote regions.

I claim:

1. A heat engine comprising: a cylinder; a piston freely reciprocally slidable within said cylinder; a casing enclosing said cylinder and having a space therewithin surrounding the outside of said cylinder, said space having axial end portions respectively communicating with the spaces in the cylinder space on opposite ends of the piston, said casing having a bearing wall part at one axial end thereof; a mass of incompressible fluid filling the interior of the cylinder and said space other than the part occupied by said piston and which is a fluid which undergoes volumetric variation with temperature variation; a piston rod fixed to said piston and extending axially of said cylinder outward through said bearing wall part; an output displacement member in the form of a sleeve fitted slidably around and coaxially slidable on said piston rod and extending slidably and sealingly through said bearing wall part, said output displacement member having a diameter substantially less than the diameter of said cylinder and having at one end thereof in the interior of the casing, a pressure-receiving surface on said displacement member for receiving a force directed outward from the casing due to thermal expansion of the fluid within the casing; cooling means for cooling the casing part near one end of the cylinder; heating means for heating the casing part near the other end of the cylinder; and a crank mechanism coupling, outside of the casing, the end parts of said piston rod and said output displacement member to an output shaft with a phase difference.

2. The heat engine as claimed in claim 1 in which said piston comprises first and second piston elements attached back-to-back, and a heat-insulating member interposed between said two piston elements.

3. The heat engine as claimed in claim 2 in which said first and second piston elements have concave recesses therein facing away from the heat-insulating member therebetween.

4. The heat engine as claimed in claim 1 in which said cooling means is a cooling-fluid passage means in the wall of said casing.

5. The heat engine as claimed in claim 1 in which said heating means is a heater disposed outside the casing for heating the wall of the casing.

6. The heat engine as claimed in claim 1, further comprising a heat insulating material interposed between the casing part cooled by said cooling means and the casing part heated by said heating means.

7. The heat engine as claimed in claim 1, further comprising first heat exchange fins disposed in said space near said one end of the cylinder, second heat exchange fins disposed in said space near said other end of the cylinder, and heat-recovery means disposed in said space between said first and second heat exchange fins.

8. The heat engine as claimed in claim 7 in which said heat-recovery means is a plurality of metal balls.

9. The heat engine as claimed in claim 1 in which the incompressible fluid is a liquid.

10. The heat engine as claimed in claim 1 in which the incompressible fluid is an alcohol.

11. The heat engine as claimed in claim 1 in which the incompressible fluid is aqueous ammonia.

12. The heat engine as claimed in claim 1 in which the incompressible fluid is a paraffin oil.

13. The heat engine as claimed in claim 1 in which the incompressible fluid is benzene.

* * * * *